Apr. 3, 1923.

H. M. GASSMAN 1,450,720

LOAD REGULATING MEANS

Original Filed Feb. 20, 1919

WITNESSES

INVENTOR
H. M. Gassman,
BY
ATTORNEYS

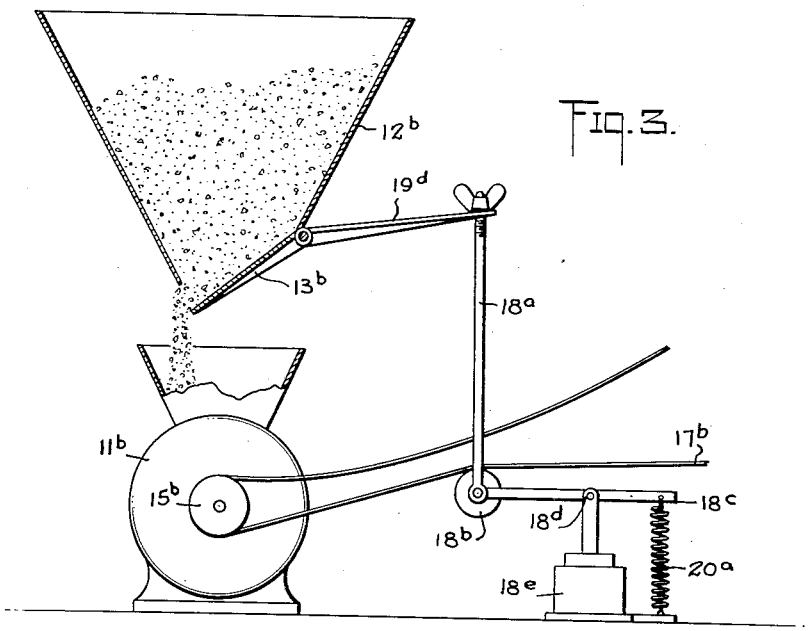

Patented Apr. 3, 1923.

1,450,720

UNITED STATES PATENT OFFICE.

HOWARD MAIN GASSMAN, OF BIRMINGHAM, ALABAMA.

LOAD-REGULATING MEANS.

Application filed February 20, 1919, Serial No. 278,218. Renewed January 19, 1922. Serial No. 530,496.

*To all whom it may concern:*

Be it known that I, HOWARD M. GASSMAN, a citizen of the United States, and a resident of Birmingham, in the county of Jefferson and State of Alabama, have invented a new and Improved Load-Regulating Means, of which the following is a description.

My invention relates to power driven grinding machines or other machinery to which material is fed and the general object of the invention is to provide a regulating means functioning to maintain the load on the motor within certain narrow limits to prevent overloading or overstraining of the equipment to thereby prevent the production of an inferior product due to excessive feed, pressure, temperature, etc., and to keep the output at maximum consistent with quality. The stated object is attained by a reasonably constant load regulating device which acts automatically in the sense that any increase of torque will react through the regulating means so as to cause the load on the driven mechanism to decrease until it reaches approximately an arbitrarily set value, and conversely when the load under which the driven mechanism is operating decreases, the regulating means will function so as to bring the load back again to approximately the arbitrarily set value.

The invention will be described in connection with examples of machines driven by an electric motor and controlled in accordance with my invention, whereby to increase the output of the machines with less care and attention and less expense for maintenance and repair of the driving machinery, electric wiring and protective equpment, than with the existing regulating means including for example centrifugal governors, an important result being thus obtained of avoiding stalling of the machinery which may result in a shutdown of the plant entailing thereby material loss of time and expense, the control, particularly in the case of the feed regulating means of grinding machines for example, being of a character to entirely eliminate dependence on the speed of the electric drive motor or of the machine driven thereby, the stated result and others as will appear being attained, in the preferred forms of my invention, by an electrical device such as an electromagnet, a load relay in combination with a motor or electromagnet, a torque motor, or like device, influenced by variations in the load of the motor, in regulating the feed of the machine.

Electric means for carrying out the invention in connection with machines driven by electric motors, as well as a modification involving mechanical feed regulating means will be particularly described in the specific description following:

Reference is to be had to the accompanying drawings forming part of this specification, it being understood that the drawings are merely illustrative of practical examples of the invention.

Figure 3 is a view similar to Figures 1 and 2 but illustrating a mechanical feed regulating means.

Figure 1:
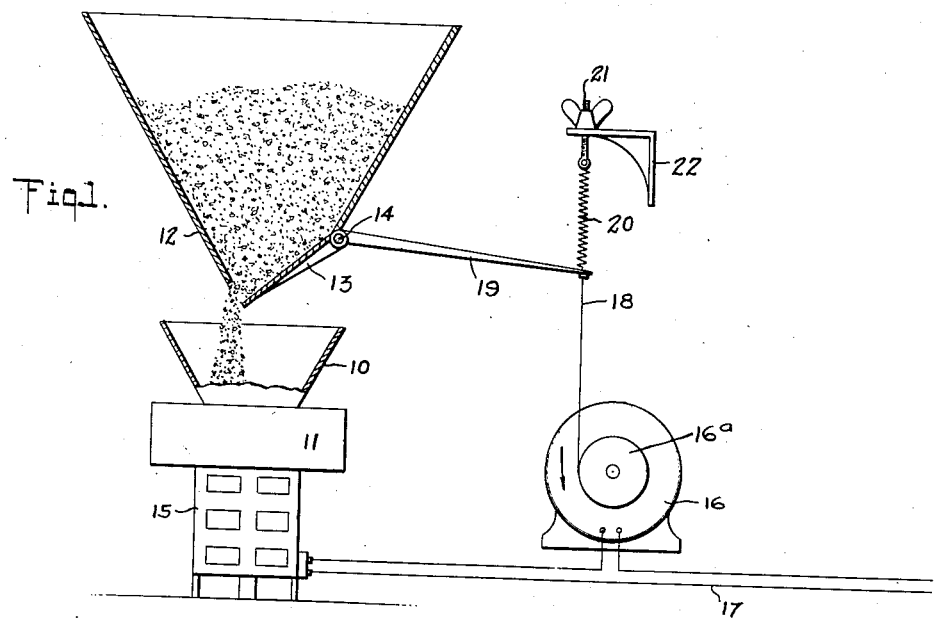
Figure 1 is a partly sectional side elevation, largely conventional and diagrammatic, of a motor-driven machine and feed means therefor regulated by my invention.
Figure 2:
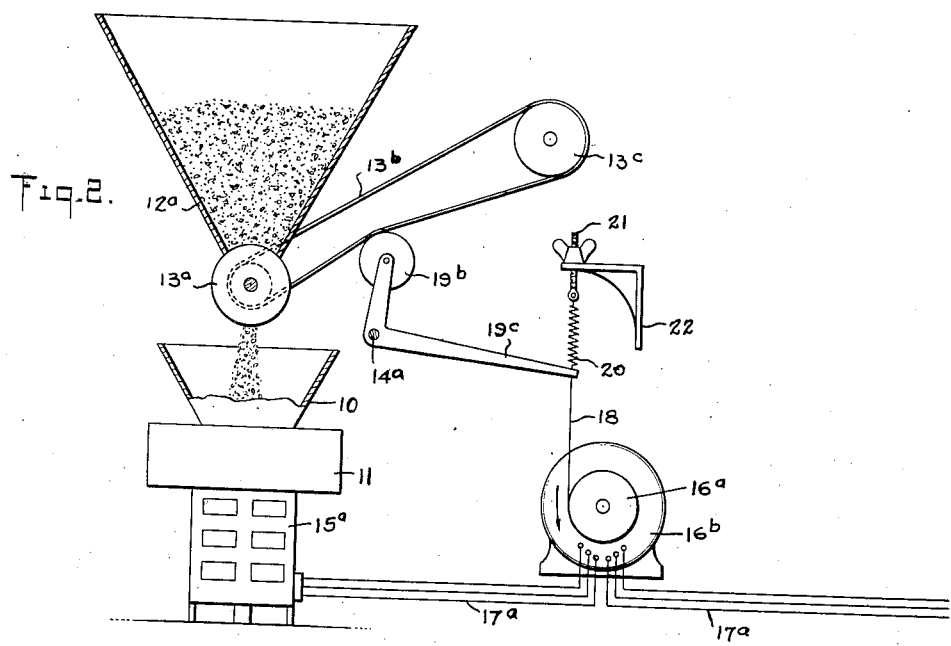
Figure 2 is a view similar to Figure 1 showing a slight modification in the means for carrying out the invention.

In the examples illustrated in Figures 1, 2 and 3, the load is regulated through the medium of a feed control device. I have conventionally indicated at 11 (Figures 1 and 2), a grinding machine having its receiving hopper 10 to which material is directed from a supply hopper 12 or 12ª. This machine 11, shown in a conventional manner, may be of any of the well known types, such as roll, gyratory or jaw crusher or grinder, tube or ball mill, for either wet or dry grinding, impact pulverizer, roller and ring mill, Chili mill, stamp mill, etc., and it is immaterial whether the effective movement of the movable part of the mill or machine for effecting the grinding action is rotary, reciprocatory or a combination of both. The outlet from the hopper is controlled by a regulator shown in Figure 1 as in the form of a flap valve or hopper bottom 13 hinged as at 14 at a side of the hopper.

The machine 11 is driven by an electric motor 15 and in the supply circuit 17 of said motor is an electric device of suitable form adapted to be influenced by the variations in the load of the drive motor 15, as the amount or character of the material fed thereto varies so as to affect the power consumed, the variation being for example in respect to hardness, mixture, temperature, or amount of moisture. Said electric means is adapted in turn to control the feed device 13 or equivalent feed regulating means. In the examples of my invention shown in Figures 1 and 2, a variable torque motor, illustrated conventionally, is employed in the drive motor circuit so that its torque may vary with variations in the load of said drive motor 15. In Figure 1, a cord or cable 18 runs from a drum 16a turning with the rotor of the torque motor 16 and is connected with an arm 19 on the feed valve 13 so that an increase in the torque at the drum 16a will exert a corresponding pull on arm 19, which tends to close the valve 13. Any suitable device is employed acting in opposition to the torque of the motor 16, there being indicated for the purpose a retractile spring 20 secured at one end to said arm 19 and secured at its upper end to a regulating screw 21 in a bracket 22 or the like, adapted to be secured to any fixed support.

With the described arrangement, an increase in the load on the drive motor 15 (by increase of feed for example) will result in an increase in the torque at the motor pulley 16a as shown by arrow, in opposition to spring 20, and a consequent closing of the feed valve 13; and conversely, a decrease in the load, and in the torque at the motor pulley 16a, will cause a relaxation of the pull on the arm 19, thereby permitting the spring 20 to react and give an opening movement to the valve 13 to increase the feed. Thus, the device functions to maintain a substantially constant torque on the driven machine (11) and in regulating the torque the most important factor in producing strain is taken care of, and the described arrangement is such that the control is independent of speed, dependence here being solely on the torque delivered to or developed by the driven machine.

The torque motor 16, Figure 1, (or 16b, Figure 2), is preferred as the medium through which the control is effected since the regulation is in a sense gradual and continuous and is not characterized by any jerks or fluctuations in power application or supply so that it has not the disadvantages of an all "on" or "off" control or a step-by-step method which might produce harmful results to the machinery or seriously interfere with the output.

The invention is applicable to motor driven grinding or other units driven by direct current or alternating current motors. In motor driven and especially direct connected units, the speed remains practically constant for a wide variation in load or is so nearly constant that a feed regulator, involving for example a centrifugal governor, would need to be exceedingly sensitive in order to function properly with a small percentage of speed change. With the described device, the matter of speed variation does not apply and the feeding or production is primarily made a function of the load as distinguished from speed, with a view of securing the maximum output from a mill or the like irrespective of the kind, size, quality or condition of the material by suitably adjusting the device to the economical power limit of the machine.

My improved device is not dependent upon speed changes but rather upon torque changes and therefore will operate with varying voltage and frequency on either D. C. or A. C. motor circuits or varying steam pressure and varying load on steam engine drive, whereas in the case of centrifugal control devices such variations in the power supply would directly affect the speed and consequently cause the centrifugal governor to function unnecessarily.

In Figure 2 there is illustrated conventionally another known form of feed device involving a feed screw at 13a, at the bottom of the hopper, and driven by a belt 13b running over a pulley on said screw and over a drive pulley 13c, which may be mechanically associated with and driven by an electric or other motor. A belt tightener acts on the belt 13b and may consist of a roller 19b to bear against said belt and mounted on one arm of a bellcrank lever 19c fulcrumed as at 14a, the other arm of said bellcrank lever being connected with the cord or cable 18 from the torque motor 16b in the supply circuit 17a of the drive motor 15. As will be apparent, as the load on the driving motor increases, this increase in load, acting through the torque motor 16b, causes the roller 19b of the belt tightener to bear with less pressure against the driving belt of the screw feed. This effect causes increased slip of the belt and consequently a decrease in the amount of material fed by the screw feed 13a.

An example of a mechanical feed regulating means dependent on variations in power the same as in the described electrically controlled feed means is shown in Figure 3. In said figure a belt driven grinder 11b is conventionally shown, the belt 17b being adapted to be driven from any convenient source of power, for example the pulley 15b of an engine driving the pulley 15b of the grinder. The individual grinder 11b receives material from a hopper 12b. The rate of flow of the material is controlled by the hinged bottom or flap valve 13b, to the arm 19d of which is adjustably connected the upper end of a rod 18a extending from the axis of the idler 18b against which the tight side of the belt 17c bears. Said idler is on one end of the bar 18c pivoted between its ends as on a standard 18d rising from a suitable base 18e, the other arm of said bar being subject to a retractile spring 20a. Thus, the idler 18b maintains the tight side of the belt deflected toward the slack side. The driving power applied to the belt tends to straighten the lower side of the belt and when the power is increased the feed is reduced by the straightening of the tight side of the belt through the consequent depression of the idler 18$^b$ which acts through the rod 18$^a$ and arm 19$^b$ to impart a closing movement to the valve 13$^b$.

I would state in conclusion that while the illustrated examples constitute practical embodiments of my invention, I do not limit myself strictly to the mechanical and electrical details herein illustrated, since manifestly the same can be considerably varied without departure from the spirit of the invention as defined in the appended claims.

Having thus described my invention, I claim as new, and desire to secure by Letters Patent:

1. Automatically regulated apparatus, comprising a driven machine, operating on material fed thereto and variable in torque in accordance with variations in the nature of the material fed thereto, a device directly responsive to said torque variations, and means associated with and controlled by said torque-responsive device for increasing or diminishing the quantity of material fed to the driven machine.

2. Automatically regulated apparatus, comprising a driven grinding apparatus, increasing in torque accordingly as the quantity of fed material increases, and conversely; a variable torque device operatively associated with said driven apparatus and increasing in torque as the torque of the grinder increases, and conversely; and means operatively associated with said variable torque device and controlled according to the torque variations of said variable torque device, to retard the feed of material to the grinder.

3. Automatically regulated apparatus, comprising a device for handling material, a motor for driving the device, a second motor in operative association with the drive-motor, responsive to torque variations thereof; and controlling mechanism actuated by an increase of torque of the second motor to thus retard the presentation of material to the handling device, and conversely.

4. Automatically regulated apparatus, including a power driven grinding apparatus, subject to variations in the imposed power load and hence in the driving torque, according to varying conditions in the material fed to said apparatus; power load regulating means similarly responsive in variations in the power load and torque to those of the said apparatus, and valve mechanism influenced by said responsive means, to control the feed of material, causing the power load of the grinder to decrease or increase to an approximately predetermined set value.

5. Automatically regulated, including a machine with drive means, adapted to operate on a material and subject to varying conditions as affecting the power load of the drive means; and means to regulate the feed of said material and thereby regulate the power load on said drive means, said regulating means being independent of speed variations of said machine and subject solely to variations in the torque developed in said driving means.

6. The combination of two electric motors mutually torque-responsive, a material grinder operated by one motor, causing a torque increase by an increase in resistance due to varying conditions in and of the material; and material charging-regulating means operated by the other motor, causing a decrease of the charge, reduction in the resistance and decrease of the torque in both motors, thus re-establishing a normal power factor.

7. An apparatus of the class described, including a machine receptive of material fed thereto, an electric drive motor for said machine, a torque motor in circuit with said drive motor to vary its torque with variations of the torque of said drive motor, and means to feed material to said machine, said means being connectible with and operable by said torque motor.

8. In combination, a machine adapted to operate on material passing therethrough, and an electric drive motor therefor adapted to develop a torque variable in accordance with the load imposed on said machine in acting upon said material; and means to control the feed of the material and thus regulate the load imposed on said machine by the material, said last-mentioned means including and being controlled by a torque motor in circuit with said drive motor and subject to variations developed in the torque in said drive motor.

9. In feed regulating devices, the combination of a material treating device, having electrical operating means including a torque motor, with a feeding device for said material treating device, said feeding device having its output controlled by the operation of said torque motor.

10. In combination, a machine for handling material fed thereto, means for driving said machine, and means responsive to variations in the torque of said driving means for controlling the amount of material fed to said machine.

11. In combination, a comminuting machine operable on material fed thereto, means for driving said machine, and means responsive to the power consumed by said machine independently of the speed thereof for automatically controlling the feed of material to said machine.

12. In combination, a machine operable on material fed thereto, means for driving said machine, means operative to control the feed of material to said machine, and a device operable in response to the power consumed by said machine independently of the speed thereof for regulating said feed-controlling means.

13. In combination, a material handling device, an electric motor for operating said device, means for feeding material to said device, and means electro-magnetically responsive to the torque of said driving motor for controlling said material-feeding means.

14. In combination, a device for treating material supplied thereto, driving means therefor, and means responsive to the power consumed by said device independently of the speed of operation thereof for automatically controlling the amount of material supplied to said device.

15. The combination with a crushing or grinding device and a motor for driving the same, of a feeder connected with the device for delivering material to be ground or crushed, a motor circuit, and means in said circuit actuated by variations of power consumed in the motor independent of the motor speed for automatically varying the quantity of the feed.

16. In combination, a machine for treating material supplied thereto, a motor for driving said machine, means operative to provide for a variable feed of material to said machine, and means responsive to the power consumed by said machine independently of the speed of operation thereof for automatically controlling said variable feed means to cause the amount of material fed to said machine to be such as results in the consumption of substantially constant power by said machine.

17. The combination with a crushing or grinding device and a motor for driving the same, of a feeder connected with the device adapted to deliver the material to be ground, a second motor adapted to drive the feeder, and means actuated by the current consumed in the first motor independently of the speed of said motor for automatically controlling the second motor.

18. In combination, a machine receptive of material fed thereto, an electric motor for operating said machine, means operative to provide for the feed of material to said machine at a variable rate, and a torque motor associated with said first motor and responsive to variation from a normal value in the electrical power consumption of said first motor independently of the speed thereof for automatically controlling said variable feed means to cause the rate of feed of material to said machine to be such as results in the consumption of substantially constant electrical power by said first motor.

HOWARD MAIN GASSMAN.

Certificate of Correction.

It is hereby certified that in Letters Patent No. 1,450,720, granted April 3, 1923, upon the application of Howard Main Gassman, of Birmingham, Alabama, for an improvement in "Load-Regulating Means," an error appears in the printed specification requiring correction as follows: Page 3, line 66, claim 5, after the word "regulated" and before the comma insert the word *apparatus;* and that the said Letters Patent should be read with this correction therein that the same may conform to the record of the case in the Patent Office.

Signed and sealed this 1st day of May, A. D., 1923.

[SEAL.]

KARL FENNING,
*Acting Commissioner of Patents.*